(12) United States Patent
Schnitzer et al.

(10) Patent No.: US 12,162,530 B2
(45) Date of Patent: Dec. 10, 2024

(54) STEERING COLUMN FOR A MOTOR VEHICLE

(71) Applicants: thyssenkrupp Presta AG, Eschen (LI); thyssenkrupp AG, Essen (DE)

(72) Inventors: Hieronymus Schnitzer, Gamprin (LI); Adam Igras, Grabs (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 18/214,942

(22) Filed: Jun. 27, 2023

(65) Prior Publication Data
US 2024/0001984 A1    Jan. 4, 2024

(30) Foreign Application Priority Data

Jun. 30, 2022 (BE) .................................. 2022/5533

(51) Int. Cl.
| | |
|---|---|
| *B62D 1/181* | (2006.01) |
| *B62D 1/184* | (2006.01) |
| *B62D 1/185* | (2006.01) |
| *B62D 1/187* | (2006.01) |
| *B62D 1/19* | (2006.01) |

(52) U.S. Cl.
CPC ............ *B62D 1/187* (2013.01); *B62D 1/184* (2013.01); *B62D 1/192* (2013.01)

(58) Field of Classification Search
CPC .......... B62D 1/18; B62D 1/181; B62D 1/184; B62D 1/185; B62D 1/187; B62D 1/192; B62D 1/195

USPC .......................................................... 74/493
See application file for complete search history.

(56) References Cited

U.S. PATENT DOCUMENTS

| | | | |
|---|---|---|---|
| 10,053,134 | B2 | 8/2018 | Sakuda et al. |
| 10,479,396 | B2 | 11/2019 | Kagawa et al. |
| 2010/0300238 | A1 | 12/2010 | Ridgway et al. |
| 2017/0247046 | A1 | 8/2017 | Huber et al. |

FOREIGN PATENT DOCUMENTS

| | | | | |
|---|---|---|---|---|
| CN | 117842167 | A * | 4/2024 | ............ B62D 1/184 |
| DE | 10 2010 021 956 | A1 | 2/2011 | |
| DE | 10 2011 056 351 | A1 | 6/2013 | |
| DE | 10 2014 016 510 | A1 | 2/2015 | |
| DE | 102015207230 | B3 * | 3/2016 | ............ B62D 1/184 |
| DE | 102019203363 | A1 | 9/2020 | |
| DE | 102020202536 | A1 | 9/2021 | |
| DE | 102021108224 | A1 | 10/2021 | |
| EP | 3 208 177 | A1 | 8/2017 | |
| EP | 3 218 246 | B1 | 9/2017 | |

(Continued)

OTHER PUBLICATIONS

Description Translation for WO 2019/030175 from Espacenet (Year: 2019).*

*Primary Examiner* — Jason D Shanske
*Assistant Examiner* — Daniel M. Keck
(74) *Attorney, Agent, or Firm* — thyssenkrupp North America, LLC (57) ABSTRACT

The present disclosure relates to a steering column for a motor vehicle, including an actuating unit. In order to render possible reduced friction and more flexible adaptation, the disclosure proposes that a stop body include a stop lever, which is mounted on the supporting unit rotatably about a lever axis (H) relative to the clamping shaft.

8 Claims, 4 Drawing Sheets

(56) References Cited

FOREIGN PATENT DOCUMENTS

| EP | 3 279 059 A1 | 2/2018 | | |
|---|---|---|---|---|
| JP | 2005001517 A | 1/2005 | | |
| WO | WO-2017025429 A1 * | 2/2017 | ............. | B62D 1/184 |
| WO | WO-2019030175 A1 * | 2/2019 | ............. | B62D 1/185 |
| WO | WO-2021049821 A1 * | 3/2021 | ............. | B62D 1/181 |

* cited by examiner

STEERING COLUMN FOR A MOTOR VEHICLE

CROSS REFERENCE TO RELATED APPLICATION

This application is a U.S. Non-Provisional that claims priority to Belgian Patent Application No. BE 2022/5533, filed Jun. 30, 2022, the entire content of which is incorporated herein by reference.

FIELD

The disclosure generally relates to a steering column for a motor vehicle, and more specifically to a including an actuating unit to render possible reduced friction and more flexible adaptation.

BACKGROUND

In an adjustable steering column of this kind, longitudinal adjustment of the steering wheel position of the steering wheel, which is attached to the driver-side, rear end of the steering spindle mounted rotatably about the longitudinal axis in the actuating unit, can be implemented by way of the actuating unit being able to be adjusted in the adjustment direction specified by the longitudinal axis, specifically the longitudinal direction, relative to a supporting unit secured to the vehicle.

In order to releasably fix the adjustment position, a fixing device is provided, which has a clamping shaft which is mounted on the supporting unit and is rotated either manually by means of a clamping lever or else by motor for selectively setting a release position, also called released position, or a fixing position. During driving, the fixing position is set, wherein the actuating unit is braced with the supporting unit in order to fix the steering wheel position, for example the actuating unit is fixedly clamped between side cheeks of the supporting unit by a lifting or clamping mechanism which interacts with the clamping shaft. For adjustment purposes, the clamping shaft is rotated into the release position, as a result of which the bracing is released, so that the actuating unit, together with the steering wheel, can be adjusted relative to the supporting unit.

The maximum possible adjustment path for the adjustment is limited by a limiting device, so that the actuating unit cannot be pushed into the supporting unit, in particular beyond a predefined front stop, during the longitudinal adjustment when the fixing device is in the release position. In the event of a crash, when a body strikes the steering wheel, the holding force of the fixing device secured in the fixing position is overcome by the high kinetic energy introduced, and the actuating unit is shifted forwards in the direction of travel relative to the supporting unit. In this case, an energy absorption device can be provided between the actuating unit and the supporting unit in order to generate deceleration which is as uniform as possible.

In order to implement energy absorption which is as uniform as possible and therefore deceleration in the adjustment direction over a crash path which is as long as possible in the said event of a crash, it is known to provide a so-called active limiting device, this corresponding in the longitudinal direction to an active longitudinal stop, as described in DE 10 2014 016 510 A1 for example. Here, the stop body is coupled to the clamping shaft such that it assumes a limiting position in the release position, the stop body limiting the possible adjustment path by colliding with a corresponding mating stop. When setting the fixing position, the stop body is moved to a passage position, in which it can move past the mating stop freely in the adjustment direction. On account of the limiting device being deactivated in the fixing position, the actuating unit can be displaced relative to the supporting unit on a longer crash path beyond the adjustment path generally provided for setting the steering wheel position in the event of a crash, so that advantageously extended and more uniform energy absorption is rendered possible.

In the limiting device already known, the stop element is attached directly on the clamping shaft, so that when the stop element is operated it rotates together with the clamping shaft. In addition, the stop element interacts with the clamping shaft by means of an eccentric cam contour in a displaceable manner transversely to the clamping shaft. As a result, complex movement paths of the stop element can advantageously be implemented, but increased friction can occur. In addition, structural freedom is restricted when designing the limiting device.

Thus, a need exists to render possible reduced friction and more flexible adaptation.

BRIEF DESCRIPTION OF THE FIGURES

So that those skilled in the art to which the subject disclosure appertains will readily understand how to make and use the devices and methods of the subject disclosure without undue experimentation, preferred embodiments thereof will be described in detail herein below with reference to certain figures, wherein:

In the various figures, identical parts are always denoted by the same reference signs, and will therefore generally also be referred to or mentioned only once in each case.

Figure 1:
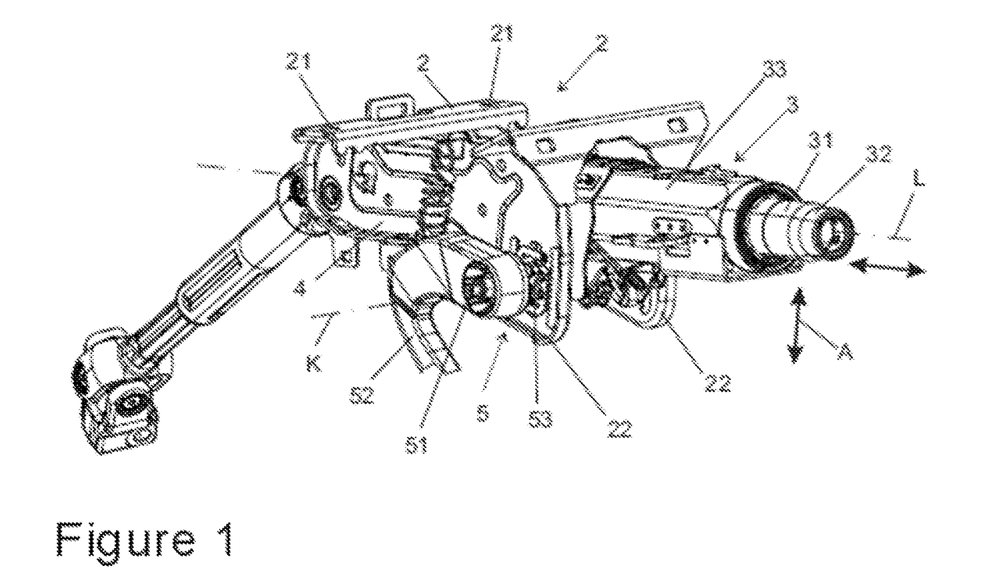
FIG. 1 shows a schematic perspective view of a steering column according to the disclosure.
Figure 2:
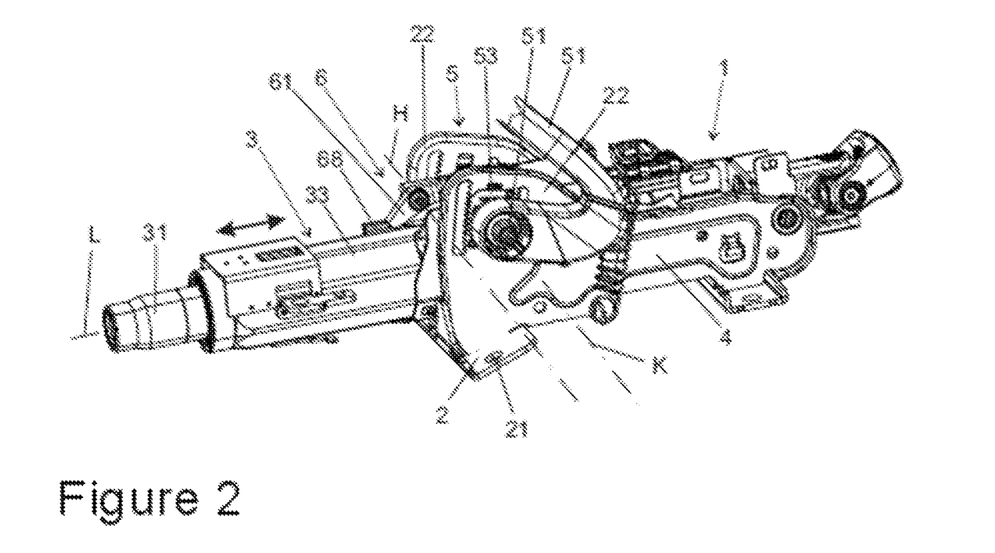
FIG. 2 shows a further schematic perspective view of the steering column according to FIG. 1.
Figure 3:
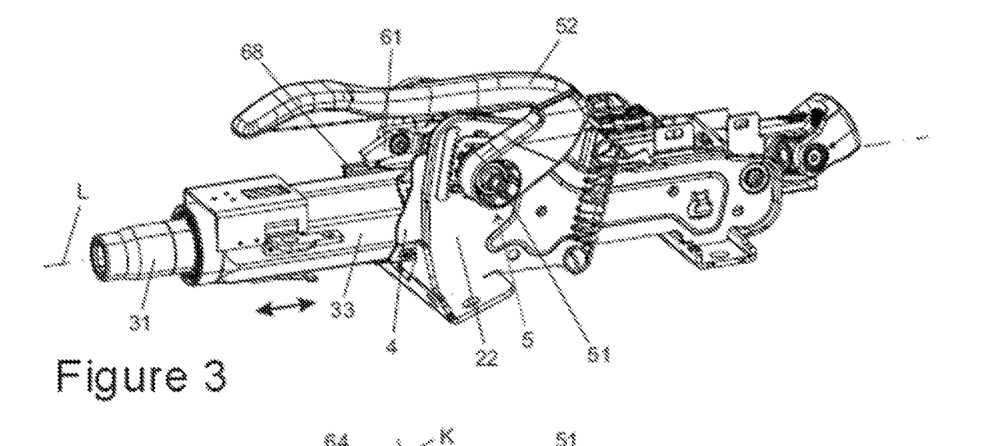
FIG. 3 shows a further schematic perspective view of the steering column according to FIGS. 1 and 2.
Figure 4:
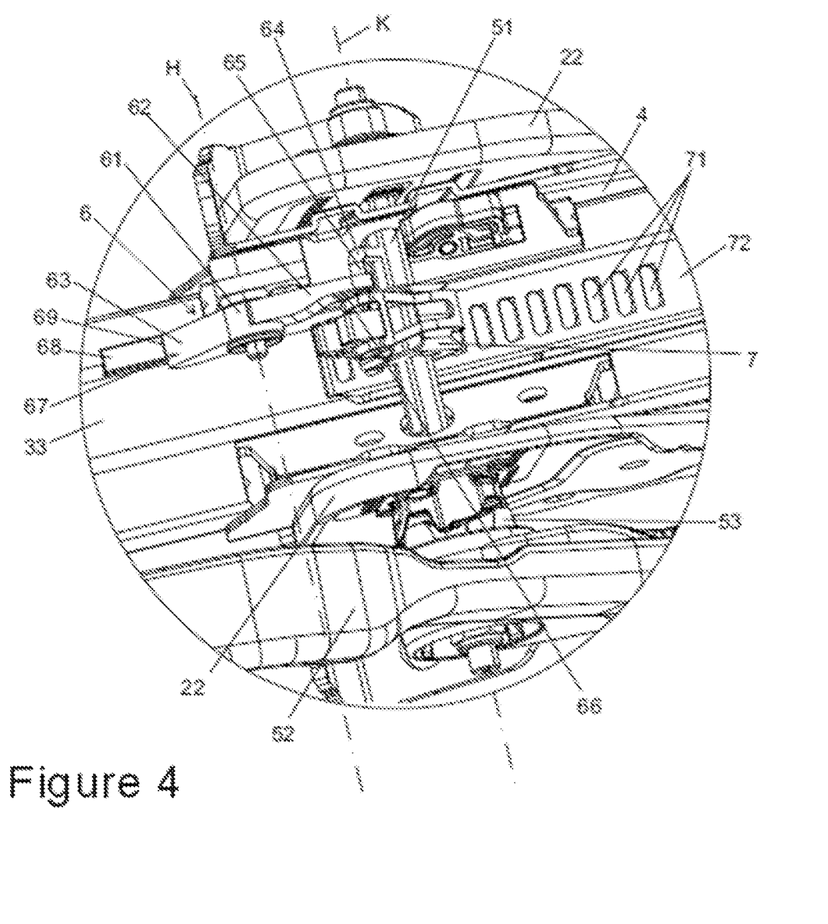
FIG. 4 shows an enlarged view of a detail of the steering column according to FIG. 1.

FIGS. 1, 2 and 3 show schematic perspective overall views of a steering column 1 according to the disclosure, and FIG. 4 shows an enlarged view of a detail.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The disclosure relates to a steering column for a motor vehicle, comprising an actuating unit, in which a steering spindle is mounted rotatably about its longitudinal axis extending in the longitudinal direction, wherein the actuating unit is held by a supporting unit in a manner adjustable relative to it in an adjustment direction, and comprising a fixing device and a limiting device interacting with it, wherein the fixing device can be selectively moved by rotation of a clamping shaft mounted on the supporting unit to a fixing position, in which the actuating unit is fixed relative to the supporting unit, or to a release position, in which the actuating unit can be adjusted relative to the supporting unit, wherein the clamping shaft is operatively connected to a stop body of the limiting device in such a way that in the release position the stop body is moved to a limiting position, in which it can stop against a mating stop of the actuating unit in the adjustment direction, and that in the fixing position the stop body is moved to a passage position, in which it is continuously adjustable beyond the mating stop in the adjustment direction.

In a steering column for a motor vehicle, comprising an actuating unit, in which a steering spindle is mounted rotatably about its longitudinal axis extending in the longitudinal direction, wherein the actuating unit is held by a supporting unit in a manner adjustable relative to it in an adjustment direction (e.g. longitudinal direction), and comprising a fixing device and a limiting device interacting with it, wherein the fixing device can be selectively moved by rotation of a clamping shaft mounted on the supporting unit to a fixing position, in which the actuating unit is fixed relative to the supporting unit, or to a release position, in which the actuating unit can be adjusted relative to the supporting unit, wherein the clamping shaft is operatively connected to a stop body of the limiting device in such a way that in the release position the stop body is moved to a limiting position, in which it can stop against a mating stop of the actuating unit in the adjustment direction, and that in the fixing position the stop body is moved to a passage position, in which it is continuously adjustable beyond the mating stop in the adjustment direction, provision is made according to the disclosure for the stop body to have a stop lever, which is mounted on the supporting unit rotatably about a lever axis relative to the clamping shaft.

According to the disclosure, the stop body is mounted on the supporting unit rotatably about a lever axis arranged separately from the clamping shaft. The lever axis is not identical to the clamping shaft, in other words is not arranged or designed so as to coincide with it. In this case, the supporting shaft is defined as positioned in a stationary manner on the supporting unit relative to the actuating unit at least in the longitudinal direction. In contrast to the prior art mentioned at the outset, the stop body is not arranged directly on the clamping shaft, and as a result cannot be displaced relative to the clamping shaft either.

In the case of the disclosure, the stop body, which is in the form of a stop lever, is pivotable about the lever axis between the limiting position and the passage position. The lever axis is clearly spatially defined and arranged separately from the clamping shaft. According to the disclosure, the stop lever is coupled to the clamping shaft in such a way that rotation of the clamping shaft is converted into rotation of the stop lever about the lever axis, which is not identical to the clamping shaft. By rotating the clamping shaft from the release position to the fixing position, the stop lever is pivoted to the passage position, and conversely by rotating the clamping shaft from the fixing position to the release position, the stop lever is pivoted into its limiting position. In this case, it is advantageous for the rotational mounting of the stop lever to be able to be designed structurally simply in respect of low friction, so that an advantageously low operating force for rotating the clamping shaft can be implemented. The operational reliability is likewise advantageously increased owing to the lower adhesion and sliding friction.

In contrast to the prior art mentioned at the outset, the stop body is not arranged movably on the clamping shaft, as a result of which lower friction and more clearly defined movement of the stop lever can be implemented as advantages.

A further advantage is that greater structural freedom in terms of the design of the limiting device is rendered possible owing to the stop lever and the separate, defined arrangement of the lever axis, for example in respect of the arrangement of the mating stop and the like.

As in the prior art, the possible adjustment path is limited by the stop body stopping against the mating stop in the release position, whereas the limiting device is deactivated in the fixing position, and the stop body can be moved past the mating stop freely in the adjustment direction. The stop lever has, in a pivotably movable region, a stop face, which can make contact with a corresponding mating stop face of the mating stop in the adjustment direction in the limiting position.

Provision is preferably made for the lever axis to be parallel to the clamping shaft. Like the clamping shaft, the lever axis can be arranged transversely, substantially perpendicularly, to the adjustment direction, with longitudinal adjustment transversely to the longitudinal axis. The parallel arrangement renders possible a structurally simple, functionally reliable and compact construction.

It may be advantageous for the lever axis to be at a distance from the clamping shaft. The distance can preferably be defined and constant. Owing to the possibility of freely predefining the distance, greater structural freedom is rendered possible, for example in terms of the arrangement of the mating stop on the actuating unit.

One advantageous embodiment is that the clamping shaft and the stop lever are coupled in such a way that, when the clamping shaft rotates, the stop lever is rotated about the lever axis in the opposite rotation direction. The conversion of the direction of rotation of the clamping shaft into a counter-rotation of the stop lever about the lever axis in the opposite rotation direction is functionally and structurally particularly advantageous. During fixing, for example, a clamping, blocking or holding element supported on the supporting unit can be moved towards the actuating unit by rotation of the clamping shaft transversely to the adjustment direction, preferably transversely to the longitudinal axis, in order to produce fixing engagement. In synchronism with this, the limiting device has to be deactivated by way of the stop body being moved from its limiting position to the passage position. To this end, for example, a stop face of the stop lever can be moved away outwards from the stop cross section of the mating stop, as seen from the longitudinal axis. The direction of movement of the stop element is opposite to the said clamping, blocking or holding element here, it being possible to implement this in a structurally simple and compact manner advantageously by way of the opposite directions of rotation of the clamping shaft and the stop lever.

It may be advantageous for an eccentrically projecting operating element, which engages into an operating receptacle arranged eccentrically with respect to the lever axis, to attached to the clamping shaft. The operating element, which preferably projects radially from the clamping shaft, can be articulated to the stop lever in an end region radially spaced apart from the clamping shaft. The operating element can have, for example, an operating projection projecting from the clamping shaft and having a coupling or engagement element radially spaced apart from the clamping shaft, for example a pin, cam or the like projecting axially with respect to the clamping shaft. The coupling or engagement element can engage in an articulated manner into a corresponding operating receptacle on the stop lever, for example an opening radially spaced apart from the lever axis, for example a coupling or engagement opening. As a result, rotation of the clamping shaft can be positively coupled with rotation of the stop lever. It is advantageous for different directions of rotation of the clamping shaft and of the stop lever and for the lever axis to be implemented as in the above-described embodiment with little effort. In this way, the stop lever can be pivoted from the passage position to the limiting position when the clamping shaft is rotated from the fixing position to the release position, and vice versa.

In this case, a loose interlocking connection can preferably be formed between the operating element and the operating receptacle. For example, the coupling or engagement opening can be radially slot-shaped and receive the coupling or engagement element with play. As a result, smooth, interlocking positive coupling of the rotation of the stop lever and of the clamping shaft can be implemented.

It is advantageous for the operating element and/or the operating receptacle to be configured so as to reduce friction. In comparison to the sliding guides in the prior art, the rotational mounts in the disclosure can be configured more smoothly with little structural expenditure. Effective measures can be, for example, use of low-friction material pairs, such as for example metal/plastic bearing pairs, the application of plastic or hard material coatings to the bearing faces or the like.

Provision can advantageously be made for the stop lever to be in the form of a two-armed lever, which has an operating arm and a stop arm. An operating element which is arranged on the clamping shaft, for example an above-described operating projection, is articulated on the operating arm, and the stop arm has a stop face, which can stop against the mating stop, in an end region which is spaced apart from the lever axis. A simple and robust design can be achieved. It is also advantageous for different, optimized force/travel ratios relative to the movement of the clamping shaft to be implemented by the freely predefinable length and shape of the operating arm and the stop arm, and for adaptation to the spatial conditions of the steering column to be able to be made with little effort.

Provision can preferably be made for the stop lever to contain a plastic. On account of the stop lever being formed entirely or partially from a plastic, a lightweight construction and advantageous functional properties, for example a noise-reducing configuration of the stop faces, low-friction bearing or articulation, and the like, can be implemented in a cost-saving manner.

Provision can be made for a locking element to be operatively connected to the clamping shaft and in a fixing position to be able to be brought into engagement with an engagement element attached to the actuating unit. The locking element can have, for example, an interlocking element, for example a locking hook, a toothed block or the like, which engages into a corresponding mating interlocking element on the actuating unit in the fixing position in order to form an interlocking connection which acts in the adjustment direction. In this case, the locking element is operatively connected to the clamping shaft in such a way that, when the clamping shaft is rotated from the fixing position to the release position, the locking element is released from engagement with the engagement element in the release position. The actuating unit can then be adjusted relative to the supporting unit as far as the stop of the stop lever against the mating stop within the adjustment range. Conversely, when the clamping shaft is rotated from the release position to the fixing position, the locking element is brought into engagement with the engagement element. The actuating unit is then fixed relative to the supporting unit. As a result, secure fixing of the actuating unit can be ensured.

It may be advantageous for an energy absorption device to be incorporated between the clamping shaft and the actuating unit. An energy absorption device can have, in a manner known per se, an energy absorption element which is supported by way of one end on the supporting unit via the clamping shaft in the adjustment direction and by way of the other end on the actuating unit. If, in a so-called crash situation, a high crash force is exerted onto the actuating unit via the steering wheel by a body striking the steering wheel, the crash force exceeding a predefined limit value, the actuating unit is displaced relative to the supporting unit in the adjustment direction, preferably in the longitudinal direction, so as to overcome the fixing force in the fixing position of the fixing device. In so doing, at least one energy absorption element of the energy absorption device is plastically deformed, as a result of which the kinetic energy introduced is converted into deformation work and heat and therefore absorbed, so that the body striking the steering wheel is decelerated in a controlled manner and the risk of injury is reduced. The energy absorption element can absorb kinetic energy by plastic deformation and/or friction, and can comprise, in a manner known per se, a bending and/or tearing element, a cutting or deformation element, a friction element or the like.

An energy absorption device can preferably be arranged in terms of action between an engagement element and the actuating unit, and in addition or as an alternative between the locking element and the supporting unit. Therefore, the energy absorption device is coupled in and activated when the fixing device is in the fixing position, and is decoupled and deactivated when the fixing device is in the release position for adjustment.

It is preferred for the actuating unit to be adjustable in the longitudinal direction in a casing unit. The actuating unit can have, for example, an inner casing, in which the steering spindle is mounted and which is received in an outer casing of the casing unit telescopically in the longitudinal direction. According to the disclosure, the clamping shaft and the stop lever can be mounted on the outer casing around the lever axis, and the mating stop can be mounted on the inner casing.

Provision can further be made for the actuating unit to be held by the supporting unit in a vertically adjustable manner. To this end, for example, the fixing device can be configured in order to releasably fix the actuating unit or a casing unit receiving it releasably relative to the supporting unit in a vertical direction transverse to the longitudinal direction in the fixing position, and to render possible vertical adjustment in the release position.

The steering column 1 has a supporting unit 2 with fastening bores 21 for attachment to a vehicle body, not illustrated.

An actuating unit 3 comprises a steering spindle 31 which has, at its end at the rear with respect to the direction of travel and facing the driver position, a fastening portion 32 for attaching a steering wheel, not illustrated. The steering spindle 31 is mounted rotatably about a longitudinal axis L, which extends in the longitudinal direction, in an inner casing 33.

The actuating unit 3 is received in an outer casing 4 of a casing unit in a manner adjustable in the longitudinal direction, wherein the inner casing 33 is telescopic in the outer casing 4.

The outer casing 4 is held in a fixable manner between two side cheeks 22 oriented downwards—in the installation position shown in FIG. 1.

A fixing device 5 has a clamping shaft 51 which passes through the two side cheeks 22 and the outer casing 4 in a clamping direction K transverse to the longitudinal axis L. An operating lever 52, which renders possible manual rotation of the clamping shaft 51, is fixed to the clamping shaft 51. A lifting mechanism 53, which is supported on the outside of the side cheeks and can have V-pulleys, tilt pins or the like in a manner known per se and is designed in order to clamp the side cheeks 22 against the outer casing 4 when the operating lever 52 is manually rotated to the fixing position, interacts with the clamping shaft 51, wherein at the same time the inner casing 33 and therefore the actuating unit 3 are braced in the outer casing 4 and therefore relative to the supporting unit 2 and fixed in the longitudinal direction.

FIG. 2 shows the fixing device 5 in a release position, and FIG. 3 shows the same view in a fixing position.

If the clamping shaft 51 is rotated in the opposite direction by means of the operating lever 52, the fixing device 5 is moved to the release position, with the clamping force being released, and the actuating unit 3 can be adjusted relative to the outer casing 4 and therefore relative to the supporting unit 2 in the longitudinal direction, as indicated by the double-headed arrow.

Figure 5:
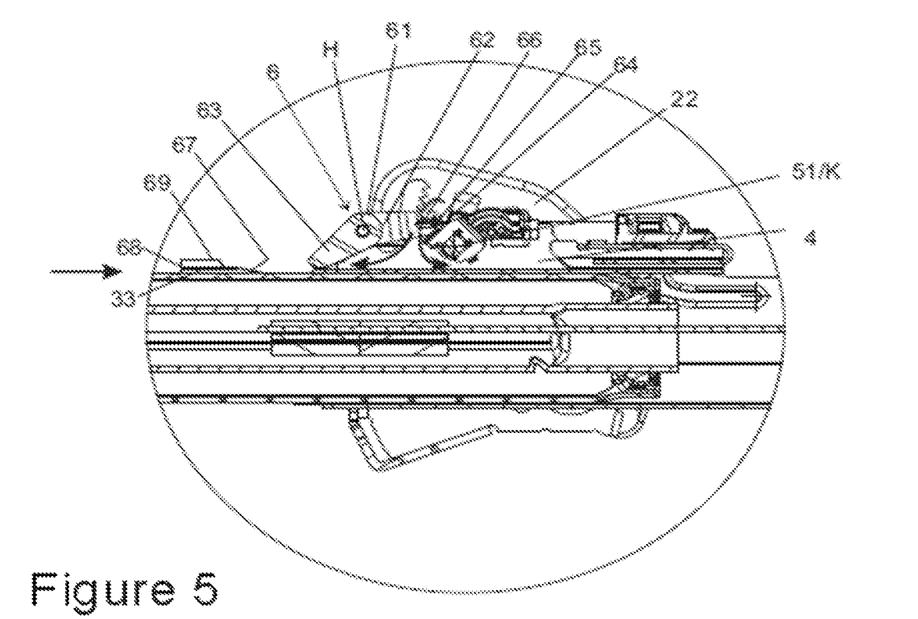
FIG. 5 shows a side view of a detail of a limiting device according to the disclosure in the release position.
Figure 6:
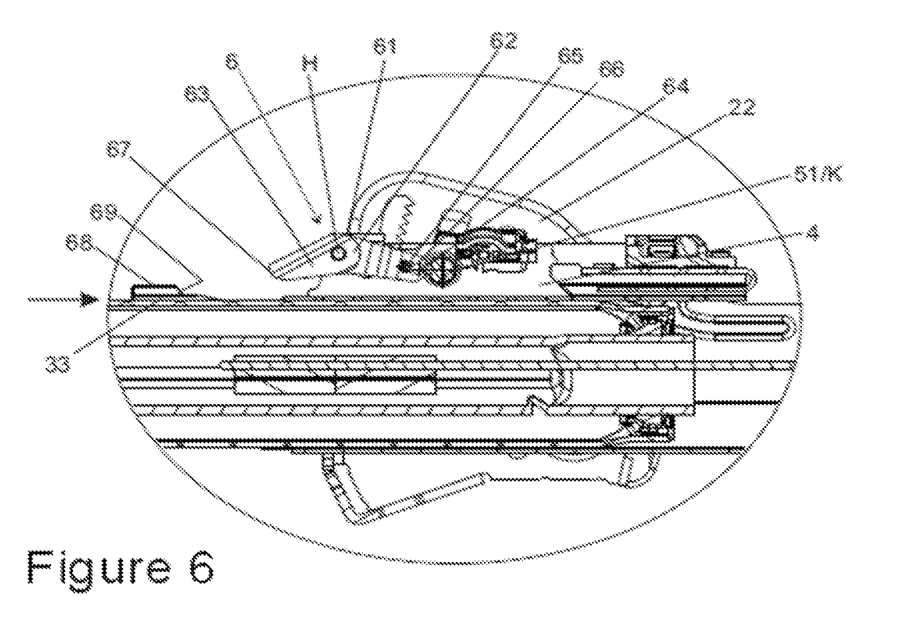
FIG. 6 shows a side view of a detail of a limiting device according to the disclosure in the passage position.

A limiting device 6 according to the disclosure has a stop lever 61 which is in the form of a two-armed lever and is mounted on the outer casing 4 rotatably about a lever axis H. FIG. 4 shows a perspective, enlarged view of a detail from below, and FIGS. 5 and 6 show schematic side views in the direction of the lever axis H or the clamping direction K, where FIG. 5 shows the limiting position of the limiting device 6 that is assumed when the fixing device 5 is in the release position according to FIG. 3, and FIG. 6 shows the passage position that is assumed when the fixing device 5 is in the release position according to FIG. 4.

The lever axis H is parallel to the clamping shaft 51, i.e. to the clamping direction K.

The two-armed stop lever 61 has an operating arm 62 and a stop arm 63. An operating projection 64, which projects radially from the clamping shaft 51, is articulated in an outer portion of the operating arm, for example by means of a pin 65 which projects parallel to the lever axis H and engages into an elongate hole 66.

The stop arm 63 has, at its radially projecting end, a stop face 67, which is directed forwards in the longitudinal direction.

An outwardly projecting mating stop 68 with a mating stop face 69, which is directed toward the rear in the longitudinal direction, is arranged on the inner casing 33.

FIG. 5 shows the release position of the fixing device 5. The stop face 67 stops against the corresponding mating stop face 69 on the mating stop 68 at the end of the possible adjustment range of the inner casing 33 relative to the outer casing 4 in the longitudinal direction. A further relative movement in the longitudinal direction and therefore the adjustment range for setting the steering wheel position is limited as a result, as is indicated by the crossed-out arrow.

If the clamping shaft 51 is rotated from the release position in the direction of the fixing position, as indicated by the bent arrow in FIG. 5, the operating projection 64 carries along the operating arm 62 by means of the pin 65 and the elongate hole 66, so that the stop lever 61 is rotated about the lever axis H in the opposite direction of rotation, as is likewise indicated by a bent arrow.

When the fixing position, as shown in FIG. 6, is reached, the stop face 67 lies against the stop lever 63 outside the limiting cross-section of the mating stop 68 and can be moved past the mating stop face 69 in the longitudinal direction, as is indicated by the arrow. This relative movement between the inner casing 33 and the outer casing 4 beyond the adjustment range can, however, take place only in the event of a crash when the crash force acting on the steering spindle 31 in the longitudinal direction is high enough to overcome the clamping action of the fixing device 5.

FIG. 4 shows an advantageous development in which a locking element in the form of a locking hook 7 is attached to the clamping shaft 51 in a rotationally fixed manner. In the fixing position of the fixing device 5, the locking hook can engage in an interlocking manner into corresponding interlocking elements 71 of an engagement element 72 attached to the inner casing 33. An energy absorption device, which can have one or more energy absorption elements which can be plastically deformed with energy absorption only in the event of a crash with a relative movement of the engagement element 72 relative to the inner casing 33, can be arranged between the engagement element 72 and the inner casing 33 in a manner known per se. In the release position, the locking hook 7 is released from the engagement element 72, so that the inner casing 33 can be adjusted without the energy absorption device being subjected to loading.

The clamping shaft 51 can be guided through vertically running elongate holes in the side cheeks 22, so that the outer casing 4, together with the actuating unit 3 and the fixing device 5, can be vertically adjusted in a vertical direction A, as is indicated in FIG. 1.

Figure 7:
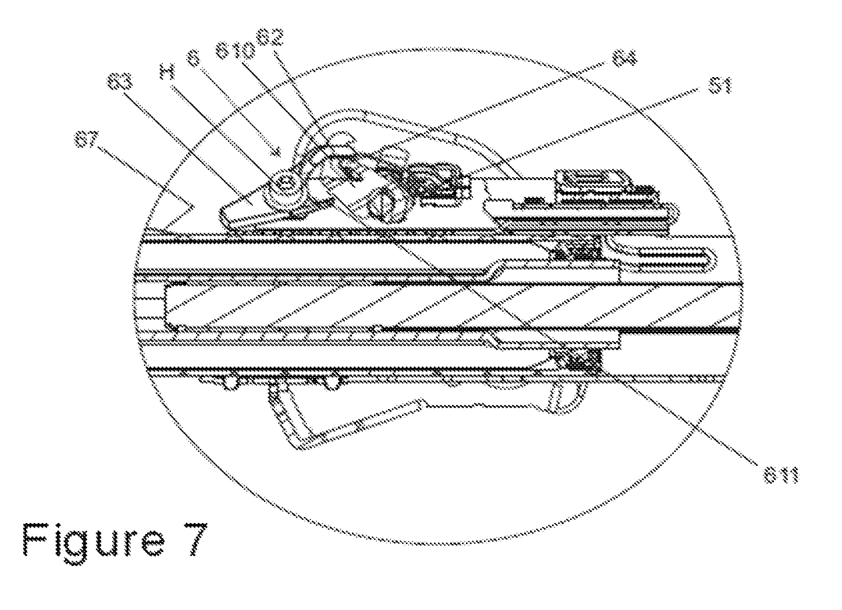
FIG. 7 shows a side view of a detail of a limiting device according to the disclosure in line with a second embodiment in a release position.
Figure 8:
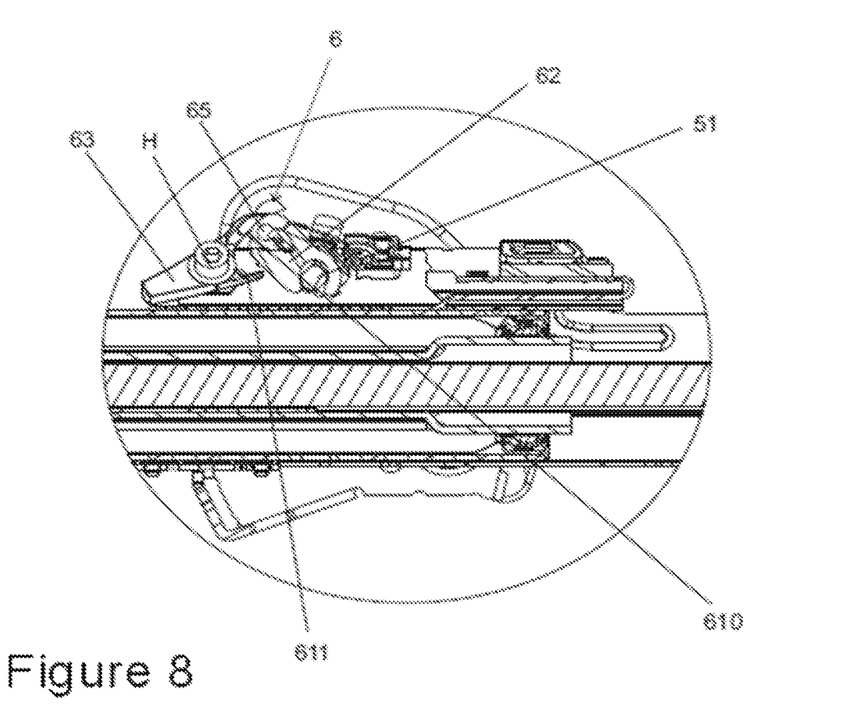
FIG. 8 shows a side view of a detail of a limiting device according to the disclosure in line with a second embodiment in a release position.

FIGS. 7 and 8 show a second embodiment of a limiting device 6 according to the disclosure. Both figures show the same construction in the same position, with the pin 65 not being illustrated in FIG. 7 for a better overview. Here, the stop arm 63 is shown in a position in which it can interact with the stop face 67. In this exemplary embodiment, the lever axis H is oriented inclined in relation to the clamping shaft 51, that is to say this axis and shaft are not parallel. Here, the stop arm 63 has an operating face 610, which is designed to be brought into contact with a pin 65, as shown in FIG. 8, in order to transmit a movement of the operating arm 62 to the stop arm 63. The stop arm 63 is reset by means of a mating operating face 611, which can interact with the pin 65.

LIST OF REFERENCE SIGNS

1 Steering column
2 Supporting unit

21 Fastening bore
22 Side cheeks
3 Actuating unit
31 Steering spindle
32 Fastening portion
33 Inner casing
4 Outer casing
5 Fixing device
51 Clamping shaft
52 Operating lever
53 Lifting mechanism
6 Limiting device
61 Stop lever
62 Operating arm
63 Stop arm
64 Operating projection
65 Pin
66 Elongate hole
67 Stop face
68 Mating stop
69 Mating stop face
610 Operating face
611 Mating operating face
7 Locking hook
71 Interlocking elements
72 Engagement element
L Longitudinal axis
K Clamping direction
H Lever axis
A Vertical direction

What is claimed is:

1. A steering column for a motor vehicle, comprising:
an actuating unit, in which a steering spindle is mounted rotatably about a longitudinal axis extending in a longitudinal direction, wherein the actuating unit is held by a supporting unit in a manner adjustable relative to it in an adjustment direction;
a fixing device; and
a limiting device, wherein the fixing device is configured to be selectively moved by rotation of a clamping shaft mounted on the supporting unit to a fixing position, in which the actuating unit is fixed relative to the supporting unit, or to a release position, in which the actuating unit is configured to be adjusted relative to the supporting unit, wherein the clamping shaft is operatively connected to a stop body of the limiting device, wherein in the release position the stop body is moved to a limiting position, wherein the stop body is configured to stop against a mating stop of the actuating unit in the adjustment direction, and wherein when setting the fixing position the stop body is moved to a passage position, in which the stop body is continuously adjustable beyond the mating stop in the adjustment direction, and wherein the stop body includes a stop lever mounted on the supporting unit rotatably about a lever axis relative to the clamping shaft,
wherein the lever axis is parallel to and spaced apart from the clamping shaft.

2. The steering column of claim 1, wherein the clamping shaft and the stop lever are coupled in such a way that, when the clamping shaft rotates, the stop lever is rotated about the lever axis in the opposite rotation direction.

3. The steering column of claim 1, further comprising an eccentrically projecting operating element, which engages into an operating receptacle arranged eccentrically with respect to the lever axis, fitted to the clamping shaft.

4. The steering column of claim 1, wherein an operating element and/or an operating receptacle and/or the stop lever are configured so as to reduce friction.

5. The steering column of claim 1, wherein the stop lever is in the form of a two-armed lever, which has an operating arm and a stop arm.

6. The steering column of claim 1, wherein the stop lever contains a plastic.

7. The steering column of claim 1, wherein a locking element is operatively connected to the clamping shaft and in a fixing position can be brought into engagement with an engagement element fitted to the actuating unit.

8. The steering column of claim 1, wherein the actuating unit is adjustable in the longitudinal direction in a casing unit.

* * * * *